(12) United States Patent
Zhou et al.

(10) Patent No.: US 11,067,866 B2
(45) Date of Patent: Jul. 20, 2021

(54) MULTI-STABLE ELECTRORESPONSIVE SMART WINDOW AND PREPARATION METHOD THEREOF

(71) Applicants: South China Normal University, Guangzhou (CN); Shenzhen Guohua Optoelectronics Co., Ltd., Shenzhen (CN); Academy of Shenzhen Guohua Optoelectronics, Shenzhen (CN)

(72) Inventors: Guofu Zhou, Guangzhou (CN); Xiaowen Hu, Guangzhou (CN); Wei Zhao, Guangzhou (CN); Haitao Sun, Guangzhou (CN)

(73) Assignees: South China Normal University, Guangzhou (CN); Shenzhen Guohua Optoelectronics Co., Ltd., Shenzhen (CN); Academy of Shenzhen Guohoa Optoelectronics, Shenzhen (CN)

( * ) Notice: Subject to any disclaimer, the term of this patent is extended or adjusted under 35 U.S.C. 154(b) by 0 days.

(21) Appl. No.: 16/498,755

(22) PCT Filed: Oct. 10, 2018

(86) PCT No.: PCT/CN2018/109635
§ 371 (c)(1),
(2) Date: Sep. 27, 2019

(87) PCT Pub. No.: WO2019/205501
PCT Pub. Date: Oct. 31, 2019

(65) Prior Publication Data
US 2020/0326580 A1    Oct. 15, 2020

(30) Foreign Application Priority Data
Apr. 28, 2018  (CN) .......................... 201810399895.9

(51) Int. Cl.
*G02F 1/137*   (2006.01)
*G02F 1/139*   (2006.01)

(52) U.S. Cl.
CPC .......... *G02F 1/13718* (2013.01); *G02F 1/139* (2013.01); *G02F 1/13775* (2021.01)

(58) Field of Classification Search
CPC .................................................. G02F 1/13718
See application file for complete search history.

(56) References Cited

U.S. PATENT DOCUMENTS

| | | | |
|---|---|---|---|
| 2008/0094551 A1 | 4/2008 | Hayashi et al. | |
| 2014/0160420 A1* | 6/2014 | Wang | C09K 19/32 349/176 |
| 2016/0026026 A1* | 1/2016 | Kim | G02F 1/13394 349/88 |

FOREIGN PATENT DOCUMENTS

| | | |
|---|---|---|
| CN | 101341528 | 1/2009 |
| CN | 202372728 | 8/2012 |

(Continued)

*Primary Examiner* — Richard H Kim
(74) *Attorney, Agent, or Firm* — Gottlieb Rackman & Reisman PC

(57) ABSTRACT

A multi-stable electroresponsive smart window and preparation method thereof are disclosed. The multi-stable electroresponsive smart window comprises a first light transmitting conductive substrate, a parallel orientation layer, a positive polymer stabilized cholesteric texture layer, a positive cholesteric texture layer and a second light transmitting conductive substrate disposed in stack successively. The multi-stable electroresponsive smart window of the present disclosure can realize a diversified light transmission state such as colored and transparent state, colored and blur state, colorless and blur state, and colorless and transparent state by changing the magnitude of the access voltage, thereby satisfying the various demands in people's work and life. In addition, the multi-stable electroresponsive smart window of (Continued)

the present disclosure has the characteristics of simple production, rich patterns, energy saving and environmental protection, which has good application prospects in the fields of window glass, home glass window and glass curtain wall, and the like.

6 Claims, 3 Drawing Sheets

(56) References Cited

FOREIGN PATENT DOCUMENTS

| | | |
|---|---|---|
| CN | 103676365 | 3/2014 |
| CN | 105319757 | 2/2016 |
| CN | 108415204 | 8/2018 |
| WO | 2004049047 | 6/2004 |
| WO | 2017002121 | 1/2017 |

* cited by examiner

MULTI-STABLE ELECTRORESPONSIVE SMART WINDOW AND PREPARATION METHOD THEREOF

CROSS-REFERENCE TO RELATED APPLICATIONS

This application is the United States National Stage entry under 35 U.S.C. 371 of PCT/CN2018/109635, filed on Oct. 10, 2018, which in turn claims the priority of Chinese patent application No. 201810399895.9 "MULTI-STABLE ELECTRORESPONSIVE SMART WINDOW AND PREPARATION METHOD THEREOF", filed on Apr. 28, 2018, both of which are hereby incorporated by reference in their entirety.

TECHNICAL FIELD

The present disclosure relates to the field of architecture and home life, and in particular to a multi-stable electroresponsive smart window and preparation method thereof.

BACKGROUND

The privacy protection smart window based on liquid crystal material can adjust the reflection, scattering and transmission of light according to people's needs, thus balancing the requirements for privacy protection and lighting, and can obtain richer colors by doping substances such as dyes, and the like. For example, in the colorful smart windows doped with dyes, by controlling the rotation of the liquid crystal molecules through an external voltage to drive the re-arrangement of the dye molecules, the transmission, scattering or absorption of sunlight can be achieved to meet people's needs.

However, the dye molecules will undergo discoloration and other changes under the action of ultraviolet light, which will affect the stability of the dye-doped smart window. Since the dye molecules cannot reach an ideal orientation state, the dye molecules still exhibit absorption behavior when the dye-doped smart window is in a transparent state, making the smart window unable to achieve a colorless and transparent state.

SUMMARY

In view of the deficiencies in the prior art, the technical problem to be solved by the present disclosure is to provide a multi-stable electroresponsive smart window and preparation method thereof.

The technical solution adopted by the present disclosure is:

The present disclosure provides a multi-stable electroresponsive smart window. The multi-stable electroresponsive smart window comprises a first light transmitting conductive substrate, a parallel orientation layer, a positive polymer stabilized cholesteric texture layer, a positive cholesteric texture layer, and a second light transmitting conductive substrate disposed in stack successively.

In the polymer stabilized cholesteric texture (PSCT), the polymer exists in the form of a polymeric network structure in the liquid crystal, which can greatly reduce the interaction between the polymer and the liquid crystal. The liquid crystal is divided into two types: positive liquid crystal and negative liquid crystal. The polymer stabilized cholesteric texture of the positive liquid crystal used in the present disclosure is named as positive polymer stabilized cholesteric texture.

The positive cholesteric texture of the present disclosure refers to the cholesteric texture formed of a positive liquid crystal.

Preferably, the positive liquid crystal used in the positive cholesteric texture layer is the same as that used in the positive polymer stabilized cholesteric texture layer. The use of the same positive liquid crystal can avoid the influence on the performance of the smart window due to the mixing of the substances in the two-layer structure with each other.

Preferably, the chiral dopant used in the positive cholesteric texture layer has the same chirality as the chiral dopant used in the positive polymer stabilized cholesteric texture layer. The use of the dopant having the same chirality can avoid the influence on the performance of the smart window due to the chiral offset caused by the mixing of the substances in the two-layer structure with each other.

Preferably, the positive polymer stabilized cholesteric texture layer is prepared by photocuring the raw materials comprising a polymeric monomer of 2% to 10%, a photoinitiator of 0.1% to 2%, a chiral dopant of 8% to 20%, and a positive liquid crystal of 68% to 89.9%.

Preferably, the positive cholesteric texture layer comprises a chiral dopant of 8% to 20% and a positive liquid crystal of 80% to 92%.

Wherein, the polymeric monomer can be selected from HCM008, HCM009, etc; the photoinitiator can be selected from Irgacure-651, Irgacure-819, etc., the chiral dopant can be selected from S1011, R811, etc., and the positive liquid crystal can be selected from HTW138200-100, E7, etc.

Preferably, the positive polymer stabilized cholesteric texture layer has a thickness of 5 to 50 µm.

Preferably, the positive cholesteric texture layer has a thickness of 5 to 50 µm.

Preferably, the multi-stable electroresponsive smart window further comprises a power supply assembly, the first light transmitting conductive substrate and the second light transmitting conductive substrate are electrically connected to the two poles of the power supply assembly, respectively.

The present disclosure also provides a method for preparing the above multi-stable electroresponsive smart window, which comprises the steps of:

taking or preparing a first light transmitting conductive substrate, and preparing a positive polymer stabilized cholesteric texture layer on the surface of the first light transmitting conductive substrate;

oppositely arranging the side of the first light transmitting conductive substrate on which the positive polymer stabilized cholesteric texture layer is prepared to the second light transmitting conductive substrate to prepare a liquid crystal cell; and filling the liquid crystal cell with positive cholesteric texture to prepare a positive cholesteric texture layer.

The advantages of the present disclosure are presented as follows:

The disclosure provides a multi-stable electroresponsive smart window. When no voltage is applied, the liquid crystal molecules in the positive polymer stabilized cholesteric texture layer and the positive cholesteric texture layer present an arrangement parallel to the cholesteric texture of the light transmitting conductive substrate, at this time the smart window is in a colored and transparent state. When the voltage is applied, the liquid crystal molecules of the positive cholesteric texture layer will rearrange into a focal conic state, while the liquid crystal molecules in the positive polymer stabilized cholesteric texture layer will still arrange in the original orientation due to the limitation of the polymeric network, and at this time, the smart window is in the colored and blurred state. When the access voltage is further increased, all the liquid crystal molecules in the positive polymer stabilized cholesteric texture layer and the positive cholesteric texture layer present an arrangement in a focal conic state, at this time the smart window is in a colorless and blurred state. When the access voltage is high enough, all the liquid crystal molecules in the positive polymer stabilized cholesteric texture layer and the positive cholesteric texture layer will arrange perpendicular to the light transmitting conductive substrate, and at this time the smart window is in a colorless and transparent state. Compared with the technical solutions of using the cholesteric liquid crystal layer alone and using the polymer stabilized cholesteric texture layer alone, without using a dual-frequency liquid crystal, the technical solution of the present disclosure can obtain a stable scattering state when no power is applied and can return to the original state. Moreover, the multi-stable electroresponsive smart window of the present disclosure has a diversified light transmission state, which can meet various needs in people's work and life. Additionally, the multi-stable electroresponsive smart window of the present disclosure has the characteristics of simple production, rich patterns, energy saving and environmental protection, which has good application prospects in the fields of window glass, home glass window and glass curtain wall, and the like.

DETAILED DESCRIPTION OF THE EMBODIMENTS

The concept and the technical effects of the present disclosure will be clearly and completely described in combination with the embodiments below to fully understand the objects, features and effects of the present disclosure. It is apparent that the described embodiments are only a part of the embodiments of the present disclosure, and not all of the embodiments, based on the embodiments of the present disclosure, other embodiments obtained by those skilled in the art without creative efforts belong to the scope of protection of the present disclosure.

Embodiment 1

Figure 1:
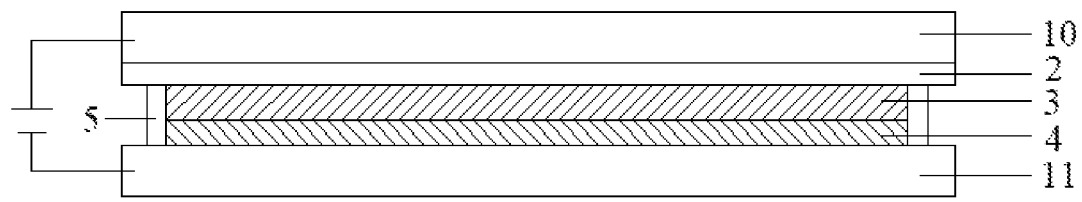
FIG. 1 is a cross-sectional schematic diagram of the multi-stable electroresponsive smart window of the present disclosure.

Referring to FIG. 1, the embodiment provides a multi-stable electroresponsive smart window. The embodiment provides a multi-stable electroresponsive smart window comprises a first light transmitting conductive substrate 10, a parallel orientation layer 2, a positive polymer stabilized cholesteric texture layer 3, a positive cholesteric texture layer 4 and a second light transmitting conductive substrate 11 disposed in stack successively. The first light transmitting conductive substrate 10 and the second light transmitting conductive substrate 11 are packaged into a liquid crystal cell by the UV glue doped with spacers 5, and are electrically connected to the power source, respectively.

Figure 2:
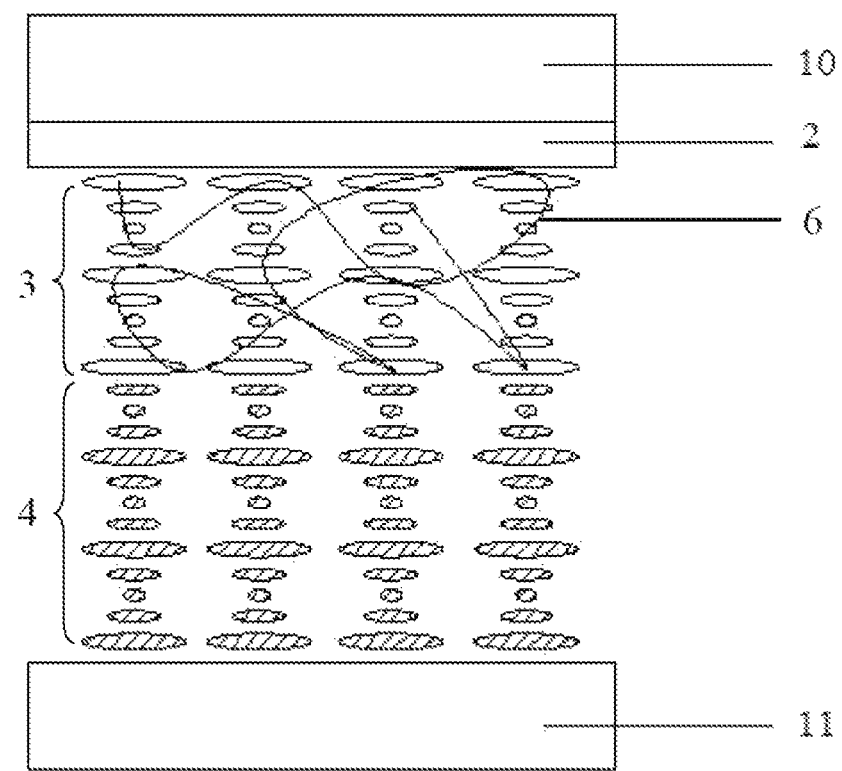
FIG. 2 is the schematic diagram of the multi-stable electroresponsive smart window of the present disclosure when no voltage is applied.

Referring to FIG. 2, when the access voltage U is equal to 0V, the liquid crystal molecules in the positive polymer stabilized cholesteric texture layer 3 and the positive cholesteric texture layer 4 present an arrangement parallel to the cholesteric texture of the light transmitting conductive substrate. At this time, the smart window can only reflect a part of visible light, and has no influence on the light of other wavebands, and thus it is in colored and transparent state.

Figure 3:
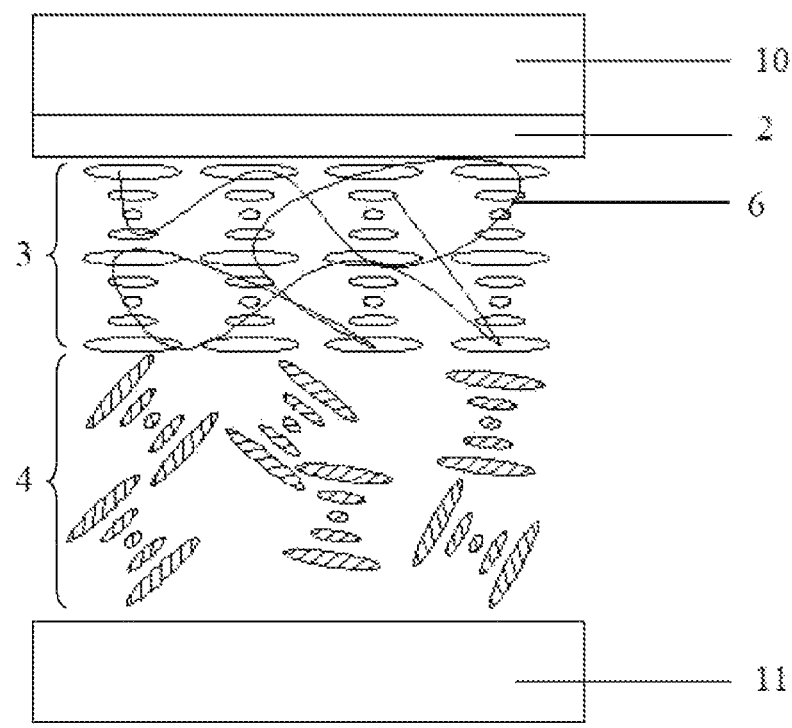
FIG. 3 is the schematic diagram of the a multi-stable electroresponsive smart window of the present disclosure when the access voltage U is equal to 22v.

Referring to FIG. 3, when the access voltage U is equal to 22v, the liquid crystal molecules of the positive cholesteric texture layer 4 are changed from the orientation parallel to the light transmitting conductive substrate to the focal conic state orientation, while the liquid crystal molecules in the positive polymer stabilized cholesteric texture layer 3 still maintains the arrangement parallel to the cholesteric texture of the light transmitting conductive substrate due to the presence of the polymeric network 6, and at that time the smart window is in colored and blurred state. In addition, the smart window can be kept in the colored and blurred state after the external voltage is turned off.

Figure 4:
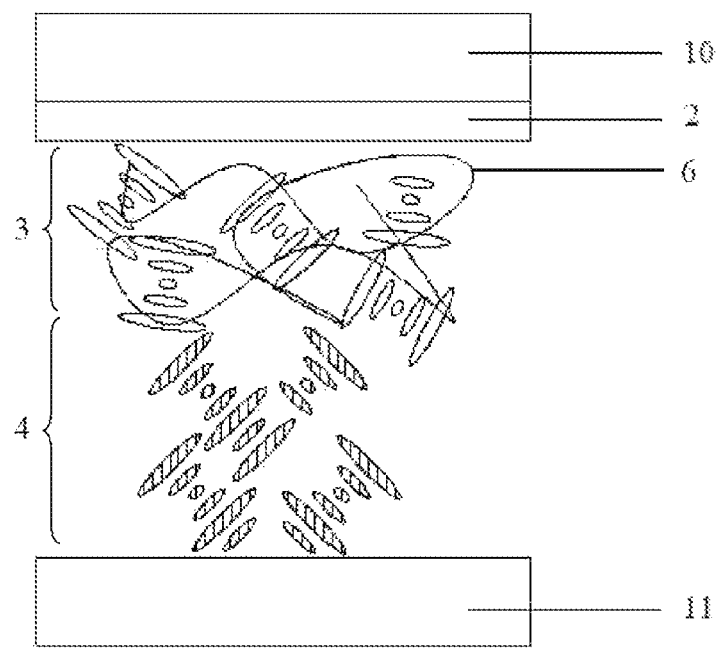
FIG. 4 is the schematic diagram of the multi-stable electroresponsive smart window of the present disclosure when the access voltage U is equal to 30v.

Referring to FIG. 4, when the access voltage U is equal to 30V, as the access voltage increases, the liquid crystal molecules in the positive polymer stabilized cholesteric texture layer 3 turns into an arrangement of focal conic state, and at that time the smart window is in a colorless and blurred state.

Figure 5:
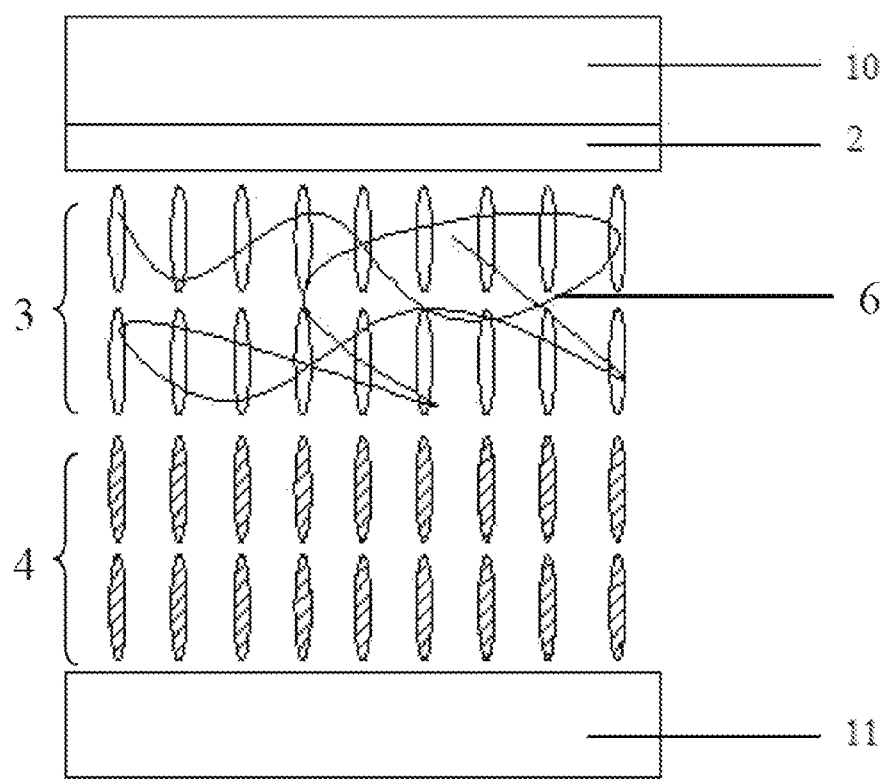
FIG. 5 is the schematic diagram of the multi-stable electroresponsive smart window of the present disclosure when the access voltage U is equal to 130v.

Referring to FIG. 5, when the access voltage is further increased, and reaches to 130V, the liquid crystal molecules in the positive polymer stabilized cholesteric texture layer 3 and the positive cholesteric texture layer 4 will arrange perpendicular to the light transmitting conductive substrate. At that time, the smart window is in a colorless and transparent state due to it can transmit the visible light. In addition, after the external voltage is turned off, the smart window can return to the colored and transparent state.

The embodiment further provides a method for preparing the multi-stable electroresponsive smart window, which comprises the steps of:

In a yellow light environment, taking 4.5 parts by mass of an achiral polymerizable monomer HCM009, 8.48 parts by mass of a levo-chiral dopant S1011, 0.2 parts by mass of a photoinitiator Irgacure-651 and 86.82 parts by mass of a positive liquid crystal HTW138200-100 and placing them into a brown bottle; adding 1 mL of dichloromethane into the brown bottle, stirring at room temperature for 30 min, and then heating at 60° C. for 8 h to completely evaporate dichloromethane, to prepare a mixture A; taking 8.9 parts by mass of a levo-chiral dopant 51011, 91.1 part by mass of a positive liquid crystal HTW138200-100 and placing them into a brown bottle; adding 1 mL of dichloromethane into the brown bottle, stirring at room temperature for 30 min, and then heating at 60° C. for 8 h to completely evaporate dichloromethane, to prepare a mixture B.

Taking a piece of light transmitting conductive substrate (such as ITO conductive glass), and then washing, oxidizing with ozone, spin-coating and rubbing the light transmitting conductive substrate to prepare a light transmitting conductive substrate to which a parallel orientation layer is attached; in a yellow light environment, taking the mixture A, a scraping rod and the light transmitting conductive substrate to which a parallel orientation layer is attached and then heating to a temperature of 45° C., craping and coating the mixture A on one side of the light transmitting conductive substrate to which a parallel orientation layer is attached by the scraping rod, wherein the scraped mixture A may have a thickness of 8 μm; photocuring the scraped mixture A by the ultraviolet light source of 200 W power for 10 minutes to prepare a polymer stabilized cholesteric texture layer; taking another clean light transmitting conductive substrate (such as ITO conductive glass), oxidizing the clean light transmitting conductive substrate with ozone, and then bonding with the above-mentioned substrate to which a polymer network stabilized cholesteric texture layer is attached using the UV glue doped with a spacer of 20 μm in diameter to prepare a liquid crystal cell, wherein the polymer network stabilized cholesteric texture layer may dispose between the two substrates; and filling the mixture B into the above liquid crystal cell on a hot stage at 90° C., naturally cooling down to the room temperature to prepare a multi-stable electroresponsive colored smart window.

Among the above compounds, HTW138200-100 is a mixed liquid crystal (purchased from Jiangsu Hecheng Display Technology Co., Ltd.), and the levo-chiral dopant S1011 (purchased from Beijing Bayi Space Liquid Crystal Technology Co., Ltd.) has a chemical structural formula of:

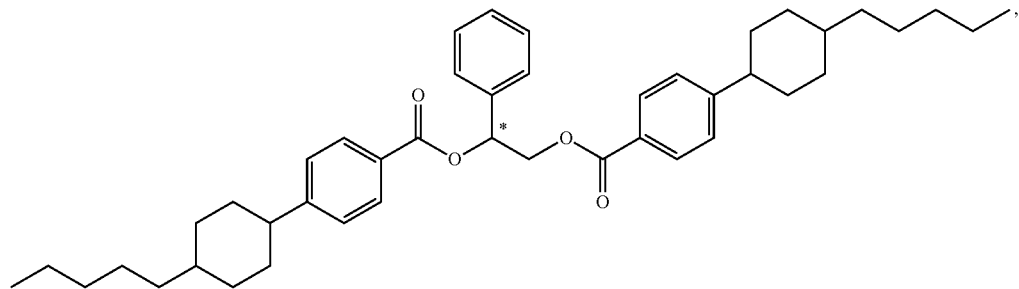 [SMILES: CCCCCC1CCC(c2ccc(C(=O)OCC(OC(=O)c3ccc(C4CCC(CCCCC)CC4)cc3)c3ccccc3)cc2)CC1]

and the polymerizable achiral liquid crystal monomer HCM009 (purchased from Jiangsu Hecheng Display Technology Co., Ltd.) has the chemical structural formula of:

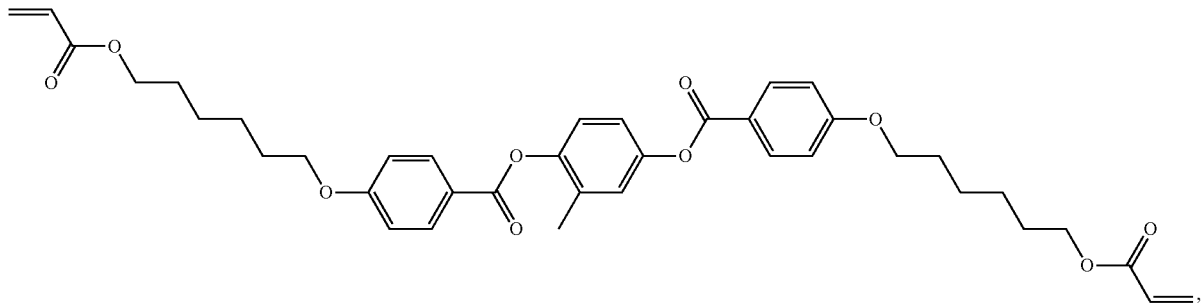 [SMILES: C=CC(=O)OCCCCCCOc1ccc(C(=O)Oc2ccc(OC(=O)c3ccc(OCCCCCCOC(=O)C=C)cc3)c(C)c2)cc1]

and photoinitiator Irgacure-651 (purchased from Tianjin Seans Biochemical Technology Co., Ltd) has the chemical structural formula of:

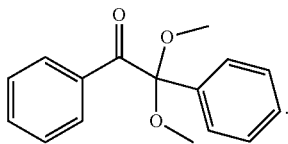 [SMILES: COC(OC)(C(=O)c1ccccc1)c1ccccc1]

Embodiment 2

The embodiment provides a method for preparing the multi-stable electroresponsive smart window, which comprises the steps of:

In a yellow light environment, taking 10 parts by mass of an achiral polymerizable monomer HCM009, 20 parts by mass of a dextro-chiral dopant R811, 2 parts by mass of a photoinitiator Irgacure-819 and 68 parts by mass of a positive liquid crystal E7 and placing them into a brown bottle; adding 1 mL of dichloromethane into the brown bottle, stirring at room temperature for 30 min, and then heating at 60° C. for 8 h to completely evaporate dichloromethane, to prepare a mixture A; taking 20 parts by mass of a dextro-chiral dopant R811, 80 parts by mass of a positive liquid crystal E7 and placing them into a brown bottle, adding 1 mL of dichloromethane into the brown bottle, stirring at room temperature for 30 min, and then heating at 60° C. for 8 h to completely evaporate dichloromethane, to prepare a mixture B.

Taking a piece of light transmitting conductive substrate (such as ITO conductive glass), and then washing, oxidizing with ozone, spin-coating and rubbing the light transmitting conductive substrate to prepare a light transmitting conductive substrate to which a parallel orientation layer is attached; in a yellow light environment, taking the mixture A, a scraping rod and the light transmitting conductive substrate to which a parallel orientation layer is attached and then heating to a temperature of 45° C., scraping and coating the mixture A on one side of the light transmitting conductive substrate to which a parallel orientation layer is attached by the scraping rod, wherein the scraped mixture A may have a thickness of 50 μm; photocuring the scraped mixture A by the ultraviolet light source of 200 W power for 10 minutes to prepare a polymer stabilized cholesteric texture layer; taking another clean light transmitting conductive substrate (such as ITO conductive glass), oxidizing the clean light transmitting conductive substrate with ozone, and then bonding with the above-mentioned substrate to which a polymer network stabilized cholesteric texture layer is attached using the UV glue doped with a spacer of 60 μm in diameter to prepare a liquid crystal cell, wherein the polymer network stabilized cholesteric texture layer may dispose between the two substrates; and the filling mixture B into the above liquid crystal cell on a hot stage at 90° C., naturally cooling down to the room temperature to prepare a multi-stable electroresponsive colored smart window.

Embodiment 3

The embodiment provides a method for preparing the multi-stable electroresponsive smart window, which comprises the steps of:

In a yellow light environment, taking 2 parts by mass of an achiral polymerizable monomer HCM009, 8 parts by mass of a dextro-chiral dopant R811, 1 part by mass of a photoinitiator Irgacure-819 and 89 parts by mass of a positive liquid crystal E7 and placing them in a brown bottle; adding 1 mL of dichloromethane into the brown bottle, stirring at room temperature for 30 min, and then heating at 60° C. for 8 h to completely evaporate dichloromethane, to prepare a mixture A; taking 8 parts by mass of a dextro-chiral dopant R811, 92 parts by mass of a positive liquid crystal E7 and placing them in a brown bottle; adding 1 mL of dichloromethane into the brown bottle, stirring at room temperature for 30 min, and then heating at 60° C. for 8 h to completely evaporate dichloromethane, to prepare a mixture B.

Taking a piece of light transmitting conductive substrate (such as ITO conductive glass) and then washing, oxidizing with ozone, spin-coating and rubbing the light transmitting conductive substrate to prepare a light transmitting conductive substrate to which a parallel orientation layer is attached; in a yellow light environment, taking the mixture A, a scraping rod and the light transmitting conductive substrate to which a parallel orientation layer is attached and then heating to a temperature of 45° C., scraping and coating the mixture A on one side of the light transmitting conductive substrate to which a parallel orientation layer is attached by the scraping rod, wherein the scraped mixture A may have a thickness of 30 μm; photocuring the scraped mixture A by the ultraviolet light source of 200 W power for 10 minutes to prepare a polymer stabilized cholesteric texture layer; taking another clean light transmitting conductive substrate (such as ITO conductive glass), oxidizing the clean light transmitting conductive substrate with ozone, and then bonding with the above-mentioned substrate to which a polymer network stabilized cholesteric texture layer is attached using the UV glue doped with a spacer of 50 μm in diameter to prepare a liquid crystal cell, wherein the polymer network stabilized cholesteric texture layer may dispose between the two substrates; and filling the mixture B into the above liquid crystal cell on a hot stage at 90° C., naturally cooling down to the room temperature to prepare a multi-stable electroresponsive colored smart window.

The invention claimed is:

1. A multi-stable electroresponsive smart window comprising:
    a first light transmitting conductive substrate, a parallel orientation layer, a positive polymer stabilized cholesteric texture layer, a positive cholesteric texture layer and a second light transmitting conductive substrate disposed in stack successively;
    wherein the positive polymer stabilized cholesteric texture layer comprises a polymeric monomer of 2% to 10%, a photoinitiator of 0.1% to 2%, a chiral dopant of 8% to 20%, and a positive liquid crystal of 68% to 89.9%; and
    wherein the positive cholesteric texture layer comprises a chiral dopant of 8% to 20% and a positive liquid crystal of 80% to 92%; and
    wherein the chiral dopant used in the positive cholesteric texture layer has the same chirality as the chiral dopant used in the positive polymer stabilized cholesteric texture layer.

2. The multi-stable electroresponsive smart window according to claim 1, wherein the positive liquid crystal used in the positive cholesteric texture layer is the same as that used in the positive polymer stabilized cholesteric texture layer.

3. The multi-stable electroresponsive smart window according to claim 1, wherein the positive polymer stabilized cholesteric texture layer has a thickness of 5 to 50 μm.

4. The multi-stable electroresponsive smart window according to claim 1, wherein the positive cholesteric texture layer has a thickness of 5 to 50 μm.

5. The multi-stable electroresponsive smart window according to claim 1, further comprising a power supply assembly, the first light transmitting conductive substrate and the second light transmitting conductive substrate are electrically connected to the two poles of the power supply assembly, respectively.

6. A method for preparing the multi-stable electroresponsive smart window according to claim 1, comprising the steps of:
    taking or preparing a first light transmitting conductive substrate, and preparing a positive polymer stabilized cholesteric texture layer on the surface of the first light transmitting conductive substrate;
    oppositely arranging the side of the first light transmitting conductive substrate on which the positive polymer stabilized cholesteric texture layer is prepared to the second light transmitting conductive substrate to prepare a liquid crystal cell; and
    filling the liquid crystal cell with positive cholesteric texture to prepare a positive cholesteric texture layer.

* * * * *